United States Patent
Hunt, Jr.

[11] Patent Number: 5,830,057
[45] Date of Patent: Nov. 3, 1998

[54] INTEGRATED TEMPERATURE-CONTROLLED CONTAINER

[75] Inventor: Hugh Jefferson Hunt, Jr., Richmond, Tex.

[73] Assignee: Coldwall Technologies Limited, Wanchai, Hong Kong

[21] Appl. No.: 731,661

[22] Filed: Oct. 17, 1996

[51] Int. Cl.⁶ ..................................................... B60P 3/20

[52] U.S. Cl. .............................. 454/118; 62/239; 62/418; 454/91

[58] Field of Search .................... 62/239, 413, 418; 454/77, 79, 91, 118

[56] References Cited

U.S. PATENT DOCUMENTS

| | | | |
|---|---|---|---|
| 2,882,701 | 4/1959 | Nelson et al. | 62/239 X |
| 2,923,384 | 2/1960 | Black | 62/239 X |
| 3,246,592 | 4/1966 | Rath | 454/91 |
| 3,386,260 | 6/1968 | Kirkpatrick | 62/239 |
| 3,805,544 | 4/1974 | Stromblad | 62/413 |
| 4,800,733 | 1/1989 | Strobel et al. | 62/239 |

Primary Examiner—Harold Joyce
Attorney, Agent, or Firm—Madan & Morris, PLLC

[57] ABSTRACT

A method and apparatus for adjusting the temperature of cargo in a container by adjusting the temperature of air within a chamber and then circulating the temperature-adjusted or conditioned air through a series of passages in the ceiling, sidewalls, floor and cargo compartment.

20 Claims, 6 Drawing Sheets

INTEGRATED TEMPERATURE-CONTROLLED CONTAINER

BACKGROUND OF THE INVENTION

1. Field of the Invention

This invention relates generally to cargo-shipping containers and more particularly to temperature-controlled cargo-shipping containers.

2. Background of the Invention

Shipping cargo, such as perishable produce, requires the use of shipping containers that can adjust the temperature of the cargo to the desired temperature and then maintain that temperature and relative humidity until the cargo arrives at its destination for unloading. Most applications require the cooling of the cargo but in cold climates, it may be necessary to maintain the cargo temperature above freezing which requires heating the cargo area. This invention is applicable to maintaining any temperature (warm or cold) and any references in the following description regarding cooling applications are meant by way of example and are not meant to limit the scope of the invention.

To save the cost and time of pre-cooling the cargo prior to loading into the shipping container, it is desirable to have a container that can quickly adjust the temperature of the cargo to the desired temperature. Once that temperature is reached it is necessary to uniformly maintain the temperature of the cargo throughout the time that the cargo is in transit, which may be several days or several weeks.

To efficiently maintain the desired temperature requires an effective delivery of temperature-adjusted air that distributes and circulates the temperature-adjusted air uniformly throughout the cargo area.

Another consideration is relative humidity. Most perishable produce, such as fruits and vegetables, require a relative humidity level of 90–100% to preserve the appearance and shelf life of the produce. Furthermore, if the relative humidity is kept at the proper level, no frost will form and, therefore, no frost damage occurs and no defrosting will be necessary.

In a unit that contains an evaporator coil to cool the cargo, the air that passes over the evaporator coil is cooled and then the cooled air is circulated through the cargo area. If there is a large temperature differential between the temperature of the air that passes over the evaporator coil and the temperature of the coil itself, there is an acceleration of the rate at which moisture is condensed or frozen out of that air. This results in an unwanted loss of moisture from the cargo which damages both the appearance and the shelf life of the produce. Therefore, it is important to have a small temperature differential, such as approximately 3° F., across the evaporator coil such that little, if any, dehumidification takes place.

Conventional refrigeration container systems typically have a temperature difference across the evaporator coil up to 10 degrees Fahrenheit which causes rapid dehumidification and can result in relative humidity levels of 70–85%. This causes dehydration which injures fresh perishable cargo and reduces the final weight of products which are sold by weight.

The temperature differential is directly proportional to the heat transfer surface of the evaporator coil. Therefore, it is desirable to integrate as large an evaporator coil as possible into the configuration of the container to provide a higher humidity-control capability. Multiple evaporator coils provide large surface areas but they increase the difficulty of manufacturing the system, they are more costly than single units and more difficult and expensive to maintain. An integrated design permits a large evaporator capability.

One type of refrigeration container currently in use is described in U.S. Pat. No. 3,386,260 by Kirkpatrick ('the Kirkpatrick patent'). Multiple evaporator coils are positioned at the bottom of the sidewalls and fans located at the top of the sidewalls force air down through the sidewalls and through the evaporator coils. The cooled air then passes into the air chambers in the floor and is drawn up through the floor into the cargo area where it passes through the cargo. The circulation of the cooled air through the cargo results in the cooling of the cargo and the warming of the air. The warmed air then rises to intake vents located at the junction of the ceiling and sidewalls. This design limits the physical size of the evaporators and, consequently, do not solve the problem of dehydration of perishables and weight loss of moisture laden products. The evaporators are also located near the floor which makes them susceptible to damage from fork lifts during loading and unloading operations.

Another example of the use of multiple evaporator coils is shown in U.S. Pat. No. 5,187,945 (the 'Dixon patent'). Evaporator coils extend longitudinally at the juncture of the sidewalls and the internal ceiling of the container with the evaporator coils distributed along both sides of the container. Air is forced over the evaporator coils by tandem centrifugal blowers directing air outwardly generally parallel to the ceiling and transverse to the length of the container. The cooled air then passes down through the cargo compartment.

Air return is provided from the floor to the sidewalls where it is drawn up to the evaporators. This system of multiple evaporators and multiple centrifugal blowers require a complicated system of manifolding and Plenum walls which makes manufacturing very difficult and expensive. The design of the apparatus in the Dixon patent puts the fan motors in the conditioned air stream which warms the air before it is circulated over the cargo. Warming conditioned air decreases the relative humidity which reverses some of the effects of the oversized evaporators. The design has proven expensive and complicated to manufacture and, therefore, has never been put into actual commerce or production.

A third type of refrigeration container, currently designed under the tradename "Nucold", is another Dixon design. The cross-container air delivery system includes eight backwards-curved impellers partially recessed into the ceiling with fan intakes from the cargo area through the fan housings, four per side. Warm return air is impelled into the corners across cooling coils and forced down the hollow extruded wall liners into the floor beneath the cargo. Cross-flow holes in the flooring allow cold air to travel towards the middle of the container and rise up through the cargo along the path of least resistance to the ceiling where the air pressure is lower. The fan/evaporator design is complicated and components interfere with each other. The design has never been successfully prototyped.

All three of the above-described prior art designs use multiple evaporator coils located in either the ceiling or sidewalls which require a complicated system of manifolding, plenum walls, multiple redundant components and wiring which is difficult and expensive to manufacture and service. Therefore, it is desirable to provide as large a single air handler unit as possible for ease of manufacturing and service.

SUMMARY OF THE INVENTION

This invention is a method and apparatus for adjusting and maintaining the cargo at a desired temperature within a shipping container. This is accomplished with fans that draw air through a single temperature-adjustment unit and then push the conditioned air through supply ducts in the ceiling and sidewalls of the container to an area in the floor of the container where the conditioned air then travels upward from apertures in the floor through the cargo to a return air duct in the ceiling and back to the temperature-adjustment unit. This circulation of conditioned air brings the temperature of the cargo to the desired temperature and then uniformly maintains that temperature.

BRIEF DESCRIPTION OF THE DRAWINGS

For a detailed understanding of the present invention, references should be made to the following detailed description of the preferred embodiment, taken in conjunction with the accompanying drawings, in which like elements have been given like numerals, and wherein:

FIG. 2A is an exploded partial view of the sidewall shown in FIG. 2.

DETAILED DESCRIPTION OF THE PREFERRED EMBODIMENTS

Figure 1:
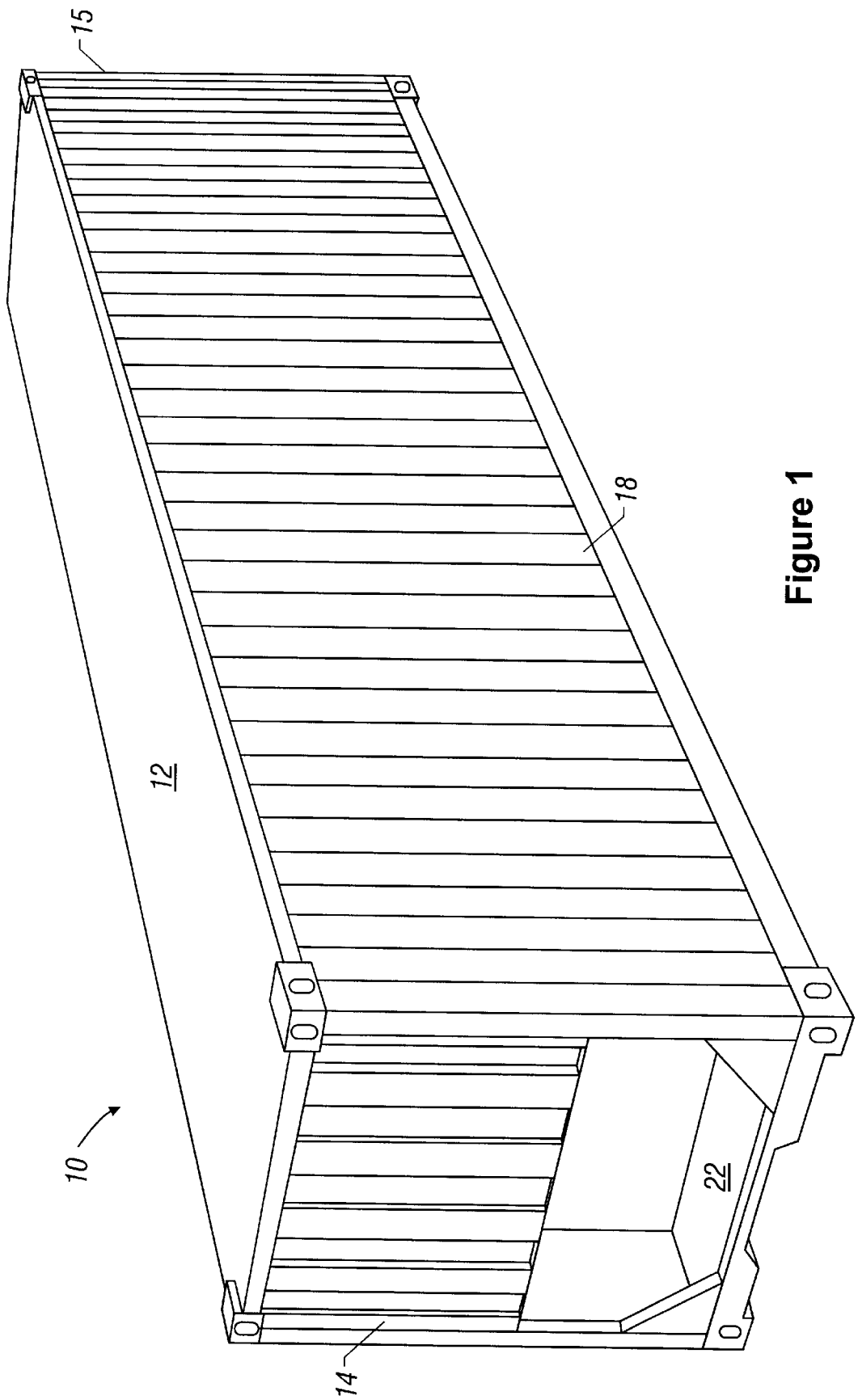
FIG. 1 is a perspective side view of an integrated temperature-controlled container of the present invention.
Figure 3:
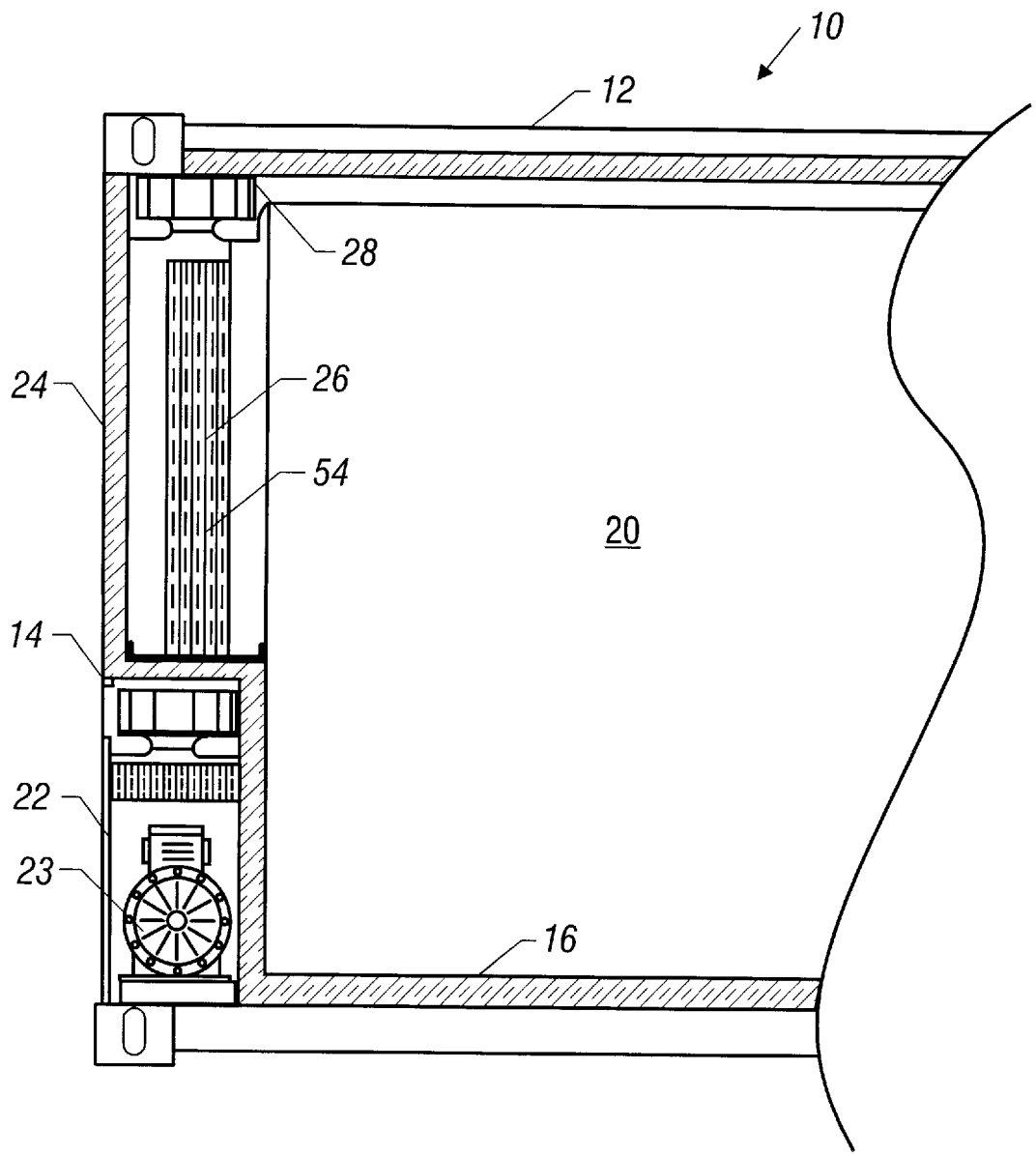
FIG. 3 is a partial cross-sectional side view of the front compartment of the container.

FIG. 1 is a perspective side view of a typical temperature-adjustment shipping container 10 of the present invention. The container 10 is rectangular and is approximately twenty or forty feet in length, nine and a half feet in height and eight feet in width. The container 10 has a ceiling chamber 12, a front compartment 14, a rear wall 15, a floor chamber 16 (shown in FIG. 3) and two sidewalls 18 which form a cargo compartment 20 (FIG. 3). The rear wall 15 typically contains hinged-doors (not shown) for loading and unloading cargo.

Figure 2:
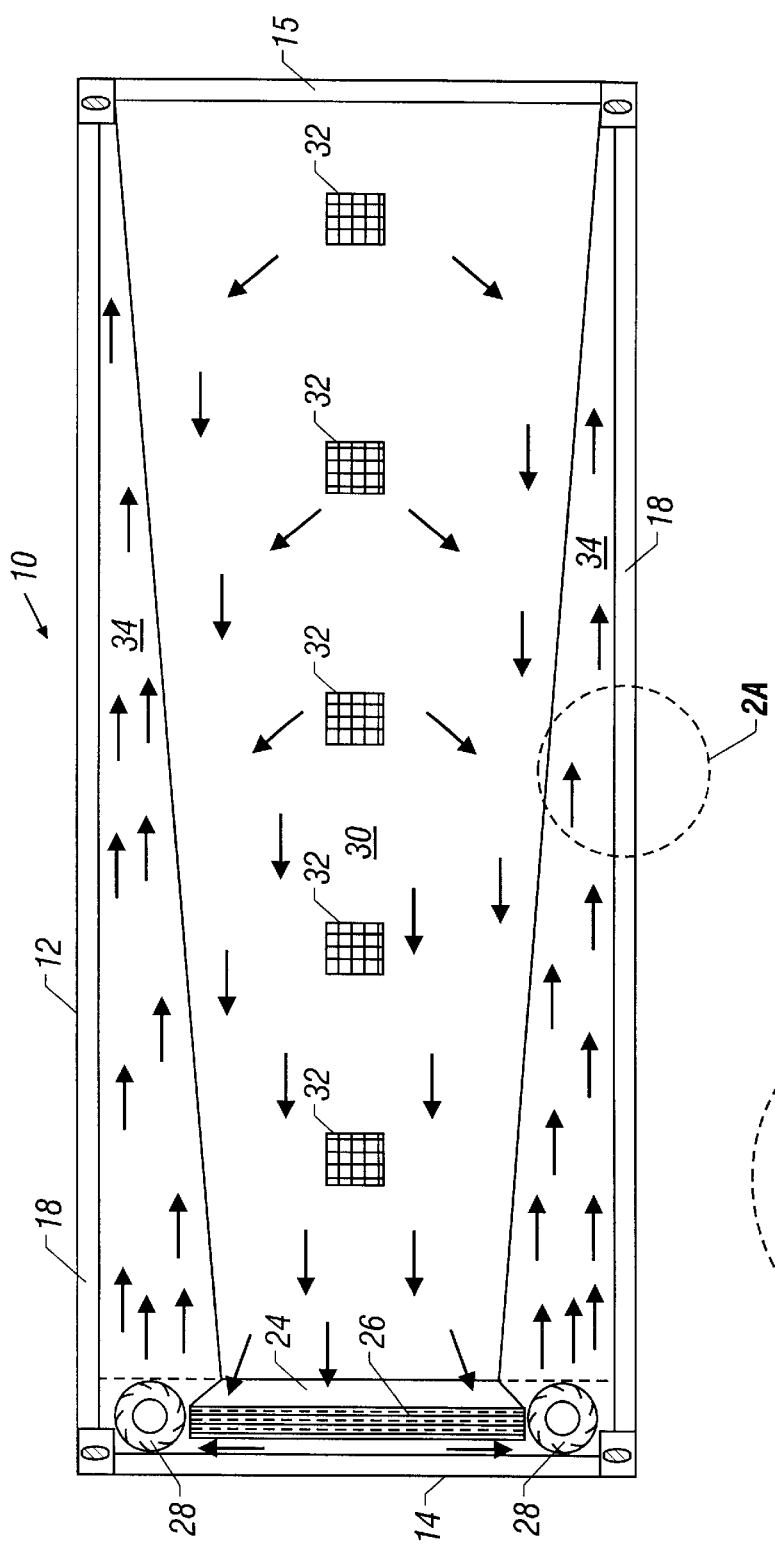
FIG. 2 is a partial cross-sectional top view of the container showing the circulation path of the conditioned air.

The front compartment 14 typically has a storage section 22 with outside access for equipment, such as a compressor 23 (FIG. 3), a generator (not shown) and a fuel storage tank (not shown) and, as shown in FIG. 2, a temperature-adjustment chamber 24 which holds a temperature-adjustment unit 26 and two fans 28.

FIG. 2 illustrates components of the ceiling chamber 12 and the temperature-adjustment chamber 24. The ceiling chamber 12 has an air return duct 30 which is tapered from its widest portion near the rear wall 15 to its narrowest portion at its intersection with the front compartment 14. Multiple air vents 32, spaced along the center of the air return duct 30, provide a passageway for air from the cargo compartment 20 (FIG. 3) to the air return duct 30. The front of the air return duct 30 opens into the temperature-adjustment chamber 24 of the front compartment 14.

Figure 4:
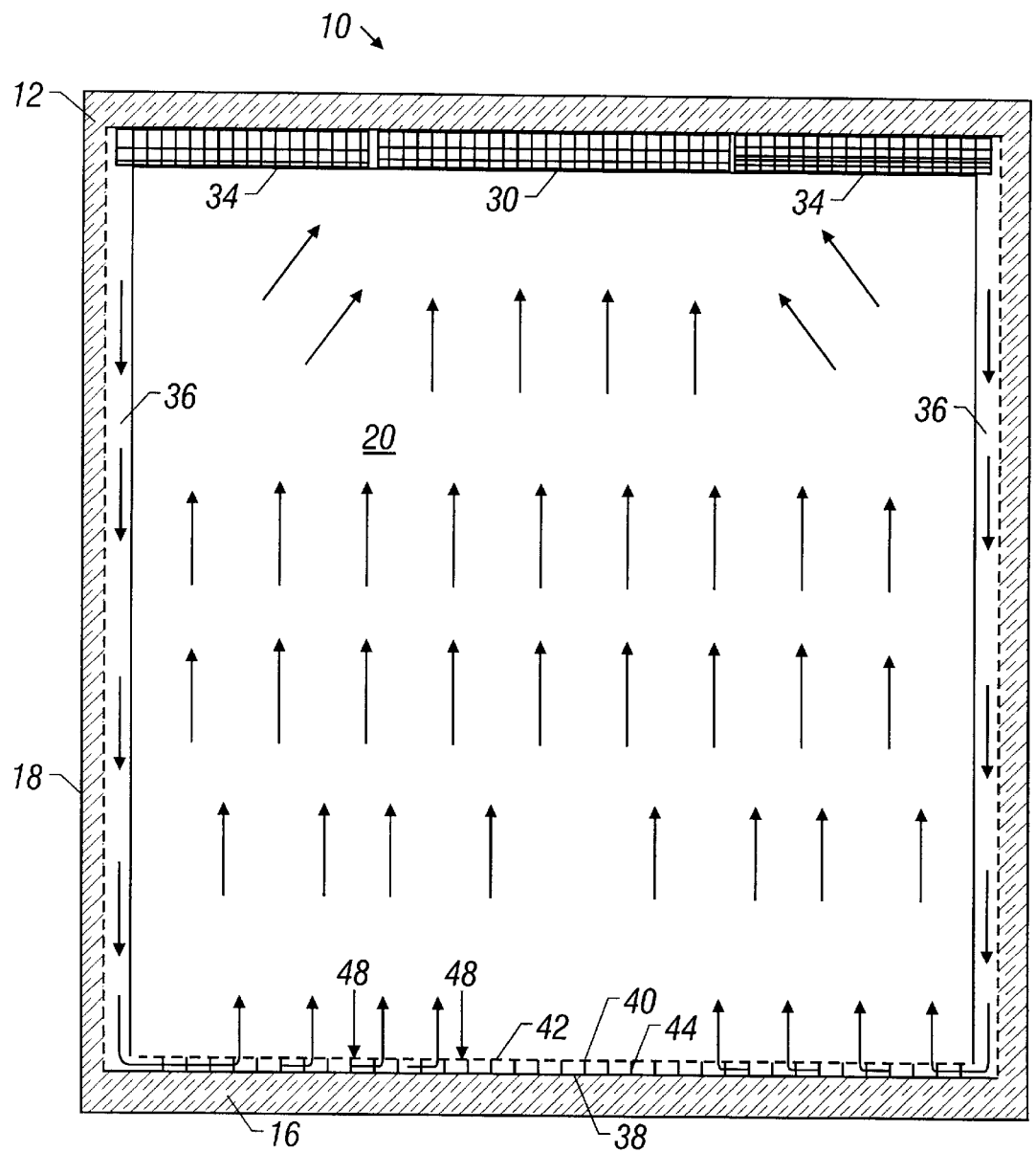
FIG. 4 is a cross-sectional front view of the container showing the air circulation path.

Two tapered air supply ducts 34, one on each side of the air return duct 30, provide passageways for air from the temperature-adjustment chamber 24 to in-wall ducts 36 located in the sidewalls 18, as shown in FIG. 2a. The in-wall ducts 36 are vertically spaced passageways for air from the air supply ducts 34 to the floor chamber 16 (FIG. 4). The top ends of the in-wall ducts 36 are shown if FIG. 2a. The air supply ducts 34 have the wider ends connected to the temperature-adjustment chamber 22 and are tapered such that the pressure of the air passing through the air supply ducts 34 remains at a constant pressure. Because some of the air is diverted into the series of in-wall ducts 36 as the air travels from the front of the air supply ducts 34 to the rear of the air supply ducts 34, the amount of air decreases from the front to the rear of the air supply ducts 34. Therefore, to keep the air at a constant pressure throughout the length of the air supply ducts 34, it is necessary to gradually reduce the cross-sectional area of the passageway from front to rear. This is accomplished with the tapering as shown in FIG. 2.

The fans 28 are installed in the top opposing sides of the temperature-adjustment chamber 24, as shown in FIG. 2–3. The fans 28 draw air from the cargo compartment 20 up through the air vents 32 in the ceiling chamber 12 into the air return duct 30 and through the temperature-adjustment unit 26. The conditioned air then is pulled through the fans 28 and forced from the temperature-adjustment chamber 24 through the air supply ducts 34, down the in-wall ducts 36 to the floor chamber 16 where it again enters the cargo compartment 20 to adjust and maintain the temperature of the cargo.

Figure 5:
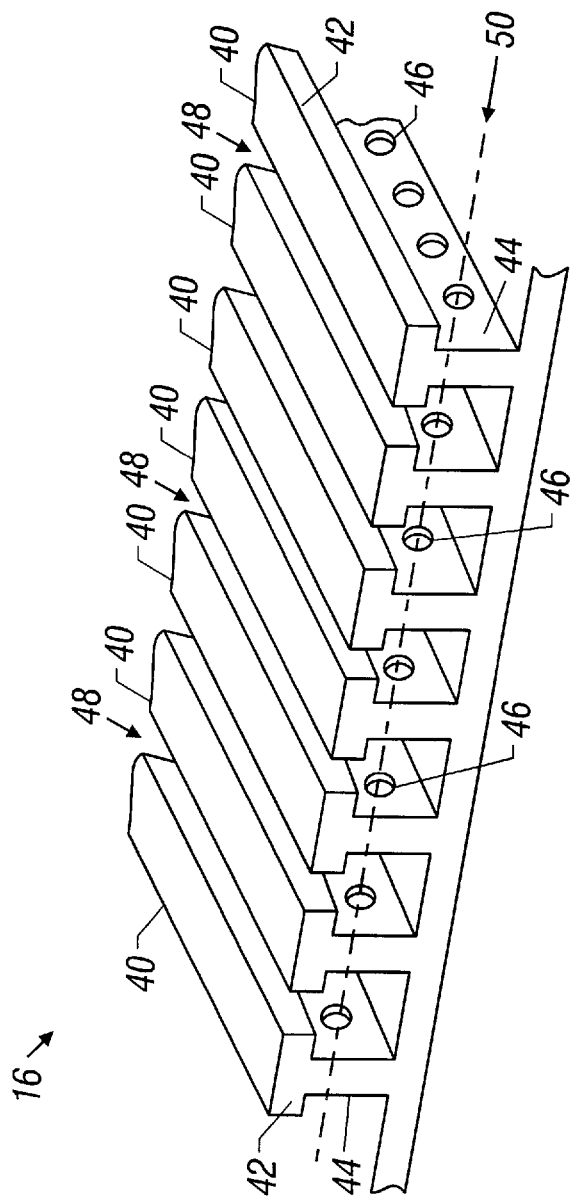
FIG. 5 is a perspective view of the floor chamber.

As shown in FIG. 4–5, the floor chamber 16 in the preferred embodiment has a floor sub-structure 38 and multiple T-rails 40. Each T-rail 40 has an horizontal member 42 and a vertical member 44. The vertical member 44 has a series of apertures 46 which provide cross-compartment passageways 50 (FIG. 5) for the conditioned air. The T-rails 40 are positioned on the floor sub-structure 38 such that gaps 48 between adjacent T-rails 40 provide a passageway from the floor chamber 16 into the cargo compartment 20 (FIG. 4).

The method of the preferred embodiment of the present invention uses the above-described air-circulation structure to uniformly adjust and maintain the temperature of the cargo in the cargo compartment 20 (see FIG. 2 and FIG. 4). As the temperature of the air in the cargo compartment 20 increases, the air rises towards the ceiling chamber 12 (FIG. 4) and is drawn through the air vents 32 (FIG. 2) along the air return duct 30 into the temperature-adjustment unit 26 in the temperature-adjustment chamber 24.

The temperature-adjustment unit 26 is an evaporator unit in the preferred embodiment. The warm return air is pulled across an evaporator coil 54 in the temperature-adjustment chamber 24. After the air is cooled, the fans 28 pull the cooled air from the temperature-adjustment chamber 24 and force the cooled air into the two air supply ducts 34. As the cooled air travels along the air supply ducts, the air along the sidewalls 18 flows down into the in-wall ducts 36 and down to the floor chamber 16, as shown in FIG. 4. As the cooled air enters the floor chamber 16, it disperses through the cross-compartment passageways 50 (FIG. 5) and then enters the cargo compartment 20 (FIG. 4) through the gaps 50 between the "T"-rails 40 providing a uniform distribution of cooled air which circulates up through the cargo compartment 20 to cool the cargo to the desired temperature.

Figure 6:
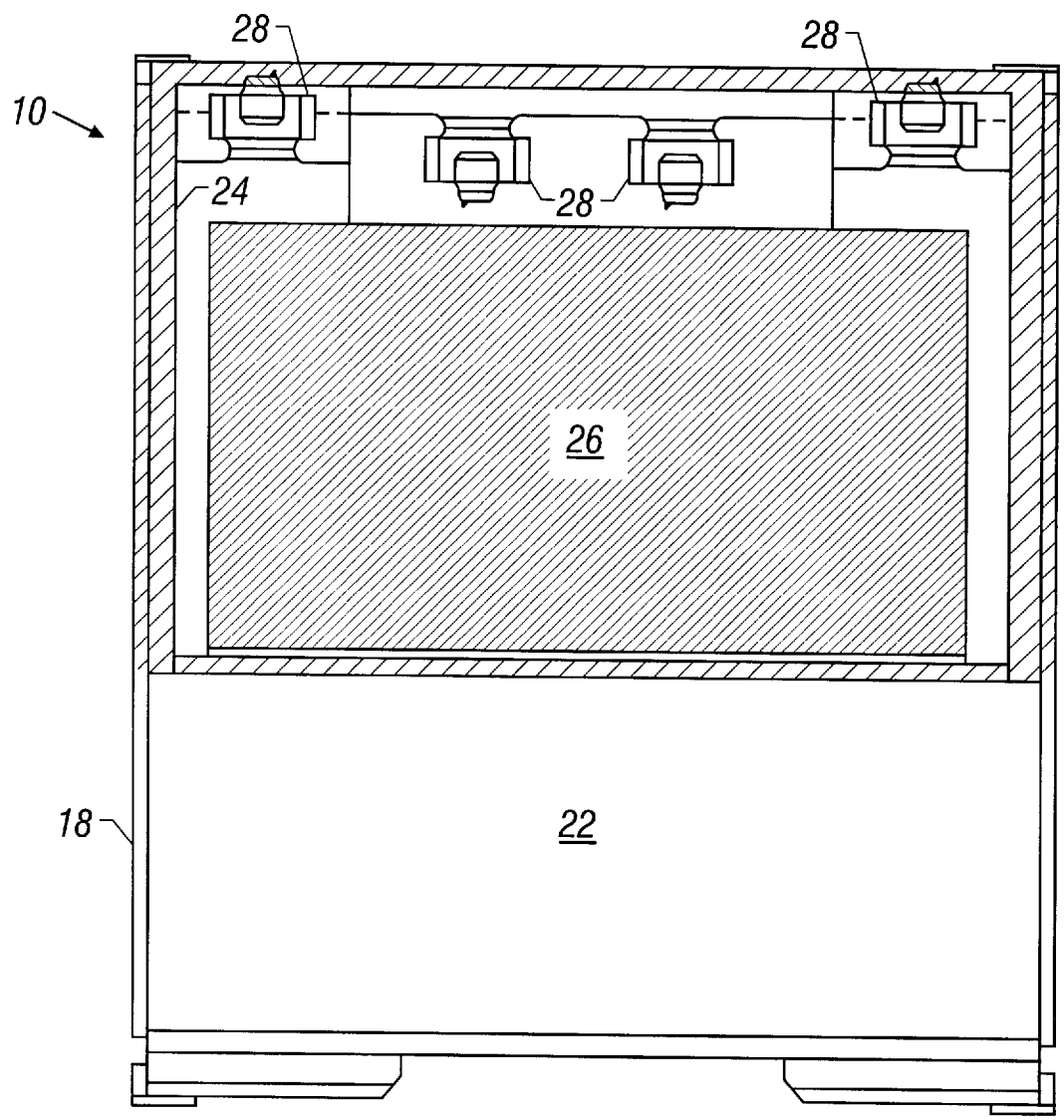
FIG. 6 is a partial, cross-sectional view of the front compartment of the container.

FIG. 6 is a partial, cross-sectional view of the front compartment 14 of another preferred embodiment of the temperature-adjustment shipping container 10 of the present invention. In this embodiment, four fans 28 are connected in series. The two fans 28 located towards the center of the front compartment 14 pull air from the cargo compartment 20 (shown in FIG. 3) up through the air vents 32 (shown in FIG. 2) in the ceiling chamber 12 into the air return duct 30 (shown in FIG. 2) to the temperature-adjustment chamber 24 and then through the temperature-adjustment unit 26.

The conditioned air is then pulled from the temperature-adjustment chamber 24 by the two fans 28 located towards the sidewalls 18 of the container 10 and forced through the air supply ducts 34 (shown in FIG. 2), down the inwall ducts 36 to the floor chamber 16 (shown in FIG. 4) before reentering the cargo compartment 20.

While the foregoing disclosure is directed to the preferred embodiments of the invention, various modifications will be apparent to those skilled in the art. It is intended that all variations within the scope and spirit of the appended claims be embraced by the foregoing disclosure.

I claim:

1. A temperature-controlled container, comprising:
   a structure defining a cargo compartment having two sidewalls, a front wall, a ceiling, a floor and a rear wall, wherein the sidewalls define air passages from the ceiling to the floor;
   wherein the front wall has a temperature-adjustment chamber;
   wherein the ceiling comprises:
      an air return duct with a plurality of air vents providing an airflow passage between the cargo compartment and the temperature-adjustment chamber; and
      two air supply ducts providing airflow passages between the temperature-adjustment chamber and the air passages in the sidewalls; and
   wherein the floor defines airflow passages between the air passages in the sidewalls and the cargo compartment;
   a temperature-adjustment unit located within the temperature-adjustment chamber; and
   at least one fan located in the temperature-adjustment chamber, wherein the fan draws air from the air return duct through the temperature-adjustment unit and forces the conditioned air into the air supply ducts and air passages in the sidewalls to the floor.

2. The container of claim 1 wherein the air return duct is centrally positioned in the ceiling.

3. The container of claim 2 wherein the two air supply ducts are positioned on either side of the air return duct.

4. The container of claim 3 wherein the two air supply ducts are tapered.

5. The container of claim 4, wherein the taper is wider at the end towards the temperature-adjustment unit.

6. The container of claim 1, further comprising a plurality of fans located in the temperature-adjustment chamber.

7. A refrigeration container, comprising:
   a structure defining a cargo compartment having a floor, a ceiling, two sidewalls, a front wall and a rear wall,
   wherein the sidewalls have a plurality of vertically-positioned air ducts which provide air passages from the ceiling to the floor; and
   wherein the front wall has a temperature-adjustment chamber;
   wherein the ceiling comprises:
      an air return duct with a plurality of air vents providing airflow between the cargo compartment and the temperature-adjustment chamber; and
      two air supply ducts providing airflow between the temperature-adjustment chamber and the plurality of air ducts in the sidewalls;
   wherein the floor defines airflow passages between the air ducts in the sidewalls and the cargo compartment;
   a temperature-adjustment unit located in the temperature-adjustment chamber;
   a plurality of fans located at opposite sides of the temperature-adjustment chamber, wherein the fans pull air from the cargo compartment through the air vents into the air return duct to the temperature-adjustment unit which adjusts the temperature of the air which is then pulled through the fans and forced through the air supply ducts down the air ducts in the sidewalls to the airflow passages in the floor and up to the cargo compartment.

8. The container of claim 7, wherein the plurality of fans comprises two fans.

9. The container of claim 7, wherein the plurality of fans comprises four fans.

10. A method of uniformly maintaining the interior of a container at a preselected temperature, said container having a ceiling a floor and two sidewalls, comprising:
    adjusting the temperature of air in the container with a temperature-adjustment unit; forcing the temperature-adjusted air from the temperature adjustment unit through at least one air supply duct in the ceiling into a plurality of airducts in the sidewalls of the container while maintaining a substantially constant pressure into said plurality of airducts and thence into air passageways in the floor of the container; and
    drawing the temperature-adjusted air up from the passageways in the floor through the interior for return to the temperature adjustment unit.

11. The method of claim 10 further comprising using an air return duct centrally positioned in the ceiling in a longitudinal orientation for conveying the air from the interior to the temperature adjustment unit.

12. The method of claim 11 wherein the at least one air supply duct comprises two air supply ducts positioned on either side of the return air duct.

13. The method of claim 10, wherein the at least one air supply duct is tapered.

14. The method of claim 13 wherein the taper is wider at the end towards the temperature adjustment unit.

15. The method of claim 10, wherein the air is forced through airducts and drawn from passageways in the floor by a plurality of fans located in the temperature-adjustment chamber.

16. A temperature-controlled container having an interior, two sidewalls, a front wall, a ceiling, a floor and a rear wall, comprising
    (a) a temperature adjustment unit for adjusting the temperature of the air;
    (b) a plurality of air passages in the sidewalls;
    (c) at least one tapered air supply duct in the ceiling adapted for conveying air from the temperature adjustment unit to said plurality of air passages in the sidewalls at a substantially constant pressure; and
    (d) air passages in the floor connected to the air passages in the sidewalls, said air passages in the floor adapted for conveying air to the inferior of the container.

17. The temperature controlled container of claim 16 further comprising a longitudinal air return duct with a plurality of air vents for conveying air from the interior of the container to the temperature-adjustment unit.

18. The temperature-controlled container of claim 16 further comprising a temperature adjustment chamber enclosing the temperature adjustment unit.

19. The temperature-controlled container of claim 18 further comprising a plurality of fans located in the temperature adjustment chamber, wherein the fans are adapted to draw air from the air return duct through the temperature-adjustment unit and force the conditioned air into the air supply duct.

20. The temperature-controlled container of claim 16 wherein the at least one air supply duct has a taper with a wider end towards the temperature adjustment unit.

* * * * *